(12) United States Patent
Tsai

(10) Patent No.: US 10,773,563 B1
(45) Date of Patent: Sep. 15, 2020

(54) SHOCK ABSORBING SYSTEM OF AMPHIBIOUS AND REMOTELY CONTROLLED VEHICLE

(71) Applicant: JASON TOYS & ELECTRONICS CO., LTD, New Taipei (TW)

(72) Inventor: Min-Lan Tsai, New Taipei (TW)

(73) Assignee: JASON TOYS & ELECTRONICS CO., LTD., New Taipei (TW)

(*) Notice: Subject to any disclaimer, the term of this patent is extended or adjusted under 35 U.S.C. 154(b) by 0 days.

(21) Appl. No.: 16/520,022

(22) Filed: Jul. 23, 2019

(30) Foreign Application Priority Data

Feb. 25, 2019 (TW) .............................. 108106342 A

(51) Int. Cl.
*B60G 5/00* (2006.01)
*B60F 3/00* (2006.01)
*B60G 17/015* (2006.01)
*A63H 17/26* (2006.01)

(52) U.S. Cl.
CPC ............ *B60F 3/0061* (2013.01); *B60F 3/003* (2013.01); *B60G 17/0152* (2013.01); *A63H 17/262* (2013.01); *B60G 2300/28* (2013.01); *B60G 2500/30* (2013.01); *B60G 2600/202* (2013.01); *B60G 2800/914* (2013.01)

(58) Field of Classification Search
CPC .... B60F 3/003; B60F 3/0061; B60F 2301/00; B60F 2301/02; B60F 2301/04; B60G 2500/30; B60G 2500/302; B60G 17/0152; B60G 17/0155; B60G 17/0157; A63H 17/262

See application file for complete search history.

(56) References Cited

U.S. PATENT DOCUMENTS

| 2,400,132 A * | 5/1946 | Edward ................ | B60F 3/0076 440/12.59 |
| 5,755,173 A * | 5/1998 | Rorabaugh ............ | B60F 3/003 114/282 |
| 6,808,430 B1 * | 10/2004 | March .................. | B60F 3/0007 440/12.52 |
| 6,945,832 B2 * | 9/2005 | Roycroft ............... | B60F 3/003 440/12.52 |

* cited by examiner

*Primary Examiner* — Andrew Polay
(74) *Attorney, Agent, or Firm* — Muncy, Geissler, Olds & Lowe, P.C.

(57) ABSTRACT

A shock absorbing system of an amphibious and remotely controlled vehicle is provided, including a chassis, a controller, a transmission shaft, six transmission members, a front wheel driving mechanism, a rear wheel driving mechanism and a smart electronic device. When the smart electronic device transmits a first control message, the controller drives the transmission shaft to pivot toward a first direction, the transmission shaft leads the six transmission members to pivot and the controller and the chassis move away from the casing of the remotely controlled vehicle. When the smart electronic device transmits a second control message, the controller drives the transmission shaft to pivot toward a second direction, the transmission shaft leads the six transmission members to pivot and the controller and the chassis move toward the casing of the remotely controlled vehicle.

6 Claims, 3 Drawing Sheets

US 10,773,563 B1

SHOCK ABSORBING SYSTEM OF AMPHIBIOUS AND REMOTELY CONTROLLED VEHICLE

BACKGROUND OF THE INVENTION

Cross-Reference to Related Application

This application claims priority from Taiwan Application No. 108106342, filed on Feb. 25, 2019, in the Taiwan Intellectual Property Office, the content of which is hereby incorporated by reference in their entirety for all purposes.

FIELD OF THE INVENTION

The present invention relates to a shock absorbing system of a vehicle. Particularly, the present invention relates to a shock absorbing system of an amphibious and remotely controlled vehicle.

DESCRIPTION OF THE RELATED ART

Nowadays, amphibious and remotely controlled vehicles are driven on the surface of the water and on the ground. The height of the chassis of a vehicle with respect to the wheels needs to be modified for different conditions of the roads. At present, chassis of some amphibious and remotely controlled vehicles may alter height by hydraulic transmission devices, wherein each hydraulic transmission device is driven by a driving apparatus to lift off or lower the chassis. However, the hydraulic transmission device would significantly increase the overall weight of the amphibious and remotely controlled vehicle, which increases power consumption of the vehicle during the driving process.

For some of other amphibious and remotely controlled vehicles, an accommodating space of a transmission device is injected with gas by a driving device so as to support the chassis, thereby lifting off or lowering the chassis. However, the transmission device capable of being injected with gas is easily damaged by external collisions. Besides, the transmission device usually occupies a significant space, which confines the internal configuration of the amphibious and remotely controlled vehicle.

For the purpose of improving the drawbacks of the prior art, the inventor of the present invention provides a shock absorbing system of an amphibious and remotely controlled vehicle.

SUMMARY OF THE INVENTION

The present invention provides a shock absorbing system of an amphibious and remotely controlled vehicle, suitable for a casing of a remotely controlled vehicle, including a chassis, a controller, a transmission shaft, a first transmission member, a second transmission member, a third transmission member, a front wheel driving mechanism, a fourth transmission member, a fifth transmission member, a sixth transmission member, a rear wheel driving mechanism and a smart electronic device. The chassis is connected to the casing of the remotely controlled vehicle. The controller is disposed in the casing of the remotely controlled vehicle and connected to the chassis. A first end of the transmission shaft is connected to the controller. One end of the first transmission member is pivotally connected to a second end of the transmission shaft, and the other end of the first transmission member is adjacent to a front end of the casing of the remotely controlled vehicle. One end of the second transmission member is pivotally connected to the other end of the first transmission member. One end of the third transmission member is pivotally connected to the other end of the second transmission member. The front wheel driving mechanism is connected to the casing of the remotely controlled vehicle and adjacent to the front end of the casing of the remotely controlled vehicle, and the front wheel driving mechanism is pivotally connected to the other end of the third transmission member. One end of the fourth transmission member is pivotally connected to the second end of the transmission shaft and the other end of the fourth transmission member is adjacent to a rear end of the casing of the remotely controlled vehicle. One end of the fifth transmission member is pivotally connected to the other end of the fourth transmission member. One end of the sixth transmission member is pivotally connected to the other end of the fifth transmission member. The rear wheel driving mechanism is connected to the casing of the remotely controlled vehicle and adjacent to the rear end of the casing of the remotely controlled vehicle, and the rear wheel driving mechanism is pivotally connected to the other end of the sixth transmission member. The smart electronic device is connected to the controller. When the smart electronic device transmits a first control message to the controller, the controller drives the transmission shaft to pivot on the first end toward a first direction according to the first control message, the transmission shaft leads the first transmission member, the second transmission member, the third transmission member, the fourth transmission member, the fifth transmission member and the sixth transmission member to pivot, and the controller and the chassis move away from the casing of the remotely controlled vehicle. When the smart electronic device transmits a second control message to the controller, the controller drives the transmission shaft to pivot on the first end toward a second direction according to the second control message, the transmission shaft leads the first transmission member, the second transmission member, the third transmission member, the fourth transmission member, the fifth transmission member and the sixth transmission member to pivot, and the controller and the chassis move toward the casing of the remotely controlled vehicle.

Preferably, when the transmission shaft pivots on the first end toward the first direction, the second end of the transmission shaft may move toward the front wheel driving mechanism; when the transmission shaft pivots on the first end toward the second direction, the second end of the transmission shaft may move toward the rear wheel driving mechanism.

Preferably, the front wheel driving mechanism may include two front wheels, a front wheel transmission shaft and a front wheel shock absorber, the two front wheels are respectively connected to two end of the front wheel transmission shaft, one end of the front wheel shock absorber is disposed to the front wheel transmission shaft, the other end of the front wheel shock absorber is pivotally connected to the other end of the third transmission member, the rear wheel driving mechanism may include two rear wheels, a rear wheel transmission shaft and a rear wheel shock absorber, the two rear wheels are respectively connected to two ends of the rear wheel transmission shaft, one end of the rear wheel shock absorber is disposed to the rear wheel transmission shaft, and the other end of the rear wheel shock absorber is pivotally connected to the other end of the sixth transmission member.

Preferably, when the controller drives the transmission shaft to pivot toward the first direction according to the first control message, the first transmission member and the fourth transmission member may move toward the front wheel shock absorber, the end of the second transmission member and the other end of the fifth transmission member move toward the chassis, and the end of the third transmission member and the end of the sixth transmission member move toward the rear wheel shock absorber; when the controller drives the transmission shaft to pivot toward the second direction according to the second control message, the first transmission member and the fourth transmission member may move toward the rear wheel shock absorber, the end of the second transmission member and the other end of the fifth transmission member move away from the chassis, and the end of the third transmission member and the end of the sixth transmission member move toward the front wheel shock absorber.

Preferably, the front wheel transmission shaft and the rear wheel transmission shaft may connect the controller, the smart electronic device transmits a first operation message to the controller, the controller drives the front wheel transmission shaft and the rear wheel transmission shaft according to the first operation message, the front wheel transmission shaft drives the two wheels to rotate, and the rear wheel transmission shaft drives the two rear wheels to rotate.

Preferably, the shock absorbing system of the amphibious and remotely controlled vehicle may further include a propeller module, one end of the propeller module is connected to the controller, the other end of the propeller module is adjacent to the rear end of the casing of the remotely controlled vehicle, the smart electronic device transmits a second operation message to the controller, and controller drives the propeller module to rotate according to the second operation message.

Embodiments of the present invention accompanied by corresponding drawings will hereinafter be described in detail such that the forgoing mentioned purposes, technical features and improvement of the present invention may become more apparent.

DETAILED DESCRIPTION OF THE PREFERRED EMBODIMENTS

The advantages, features and technical methods of this invention will be described in detail in order to be understood easier. Moreover, the present invention may be realized in different form and should not be limited to the embodiments described here. On the contrary, the provided embodiments make the disclosure more clear and define the scope of this invention entirely and completely. Further, the present invention is only defined according to the attached claims.

It is noted that the terms "dispose to", "pivotally connected to", "connected to", "drive" and "move" should be understood in a broad sense, unless otherwise confinements and limitations are stated. A person skilled in the art may appreciate the specific meaning of the forgoing terms in the present invention according to concrete conditions.

Figure 1:
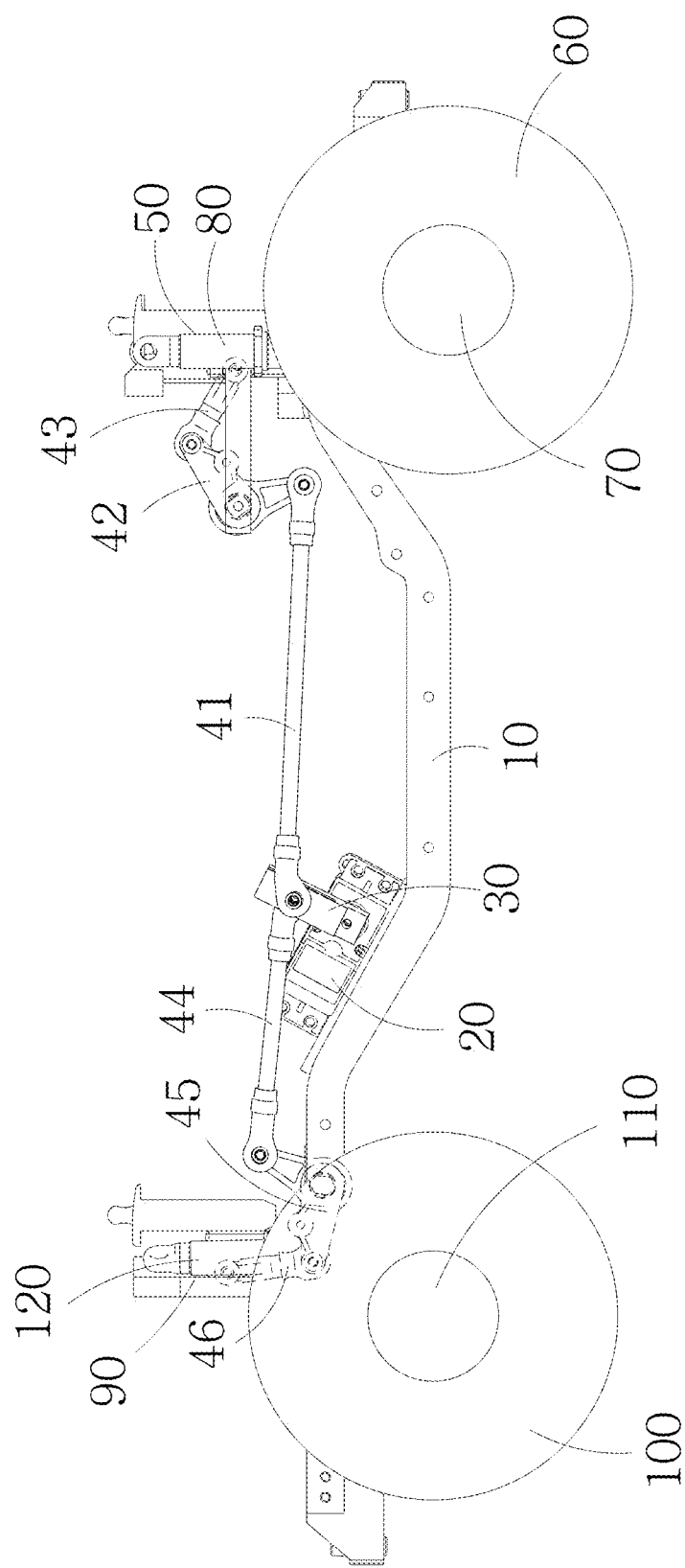
FIG. 1 depicts the first type of the chassis of the shock absorbing system of the amphibious and remotely controlled vehicle according to the present invention.
Figure 2:
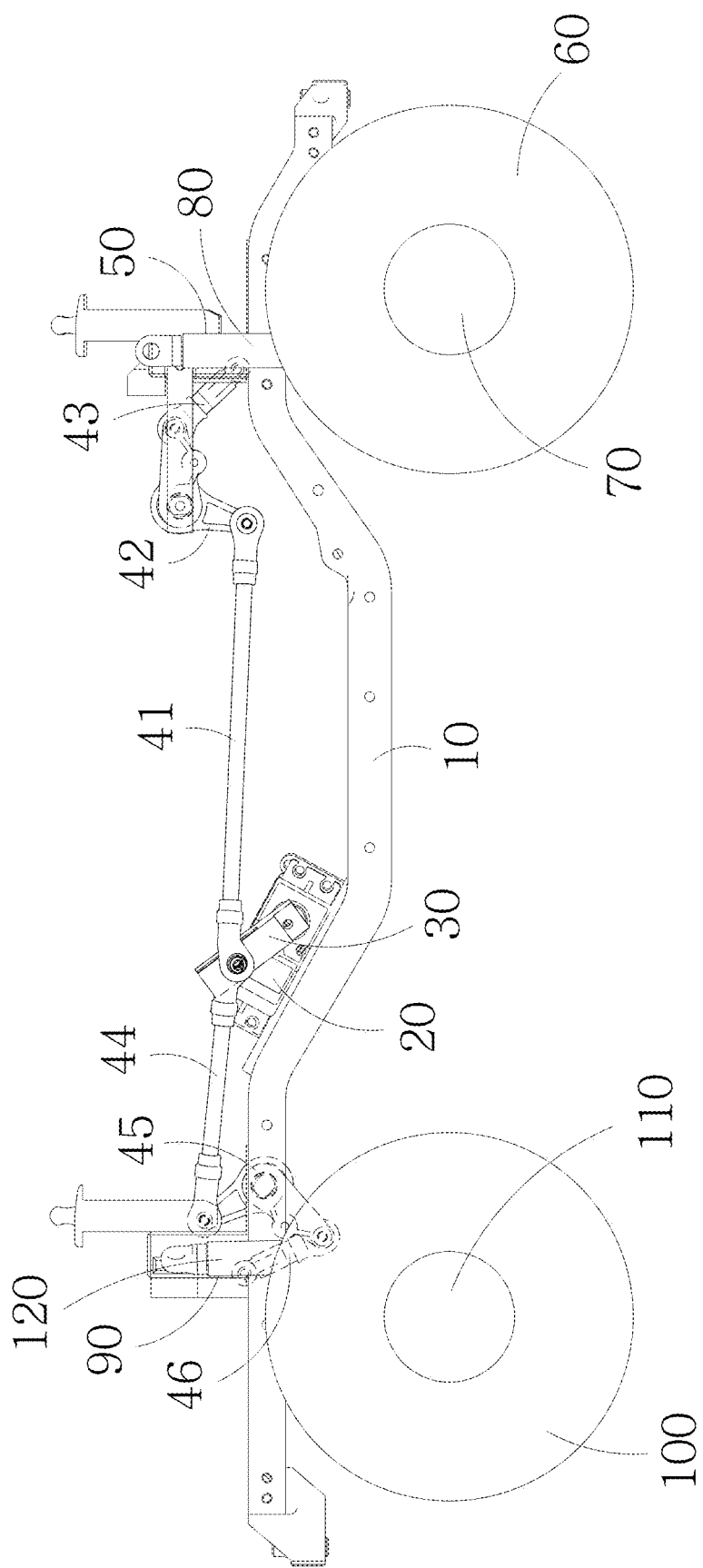
FIG. 2 depicts the second type of the chassis of the shock absorbing system of the amphibious and remotely controlled vehicle according to the present invention.
Figure 3:
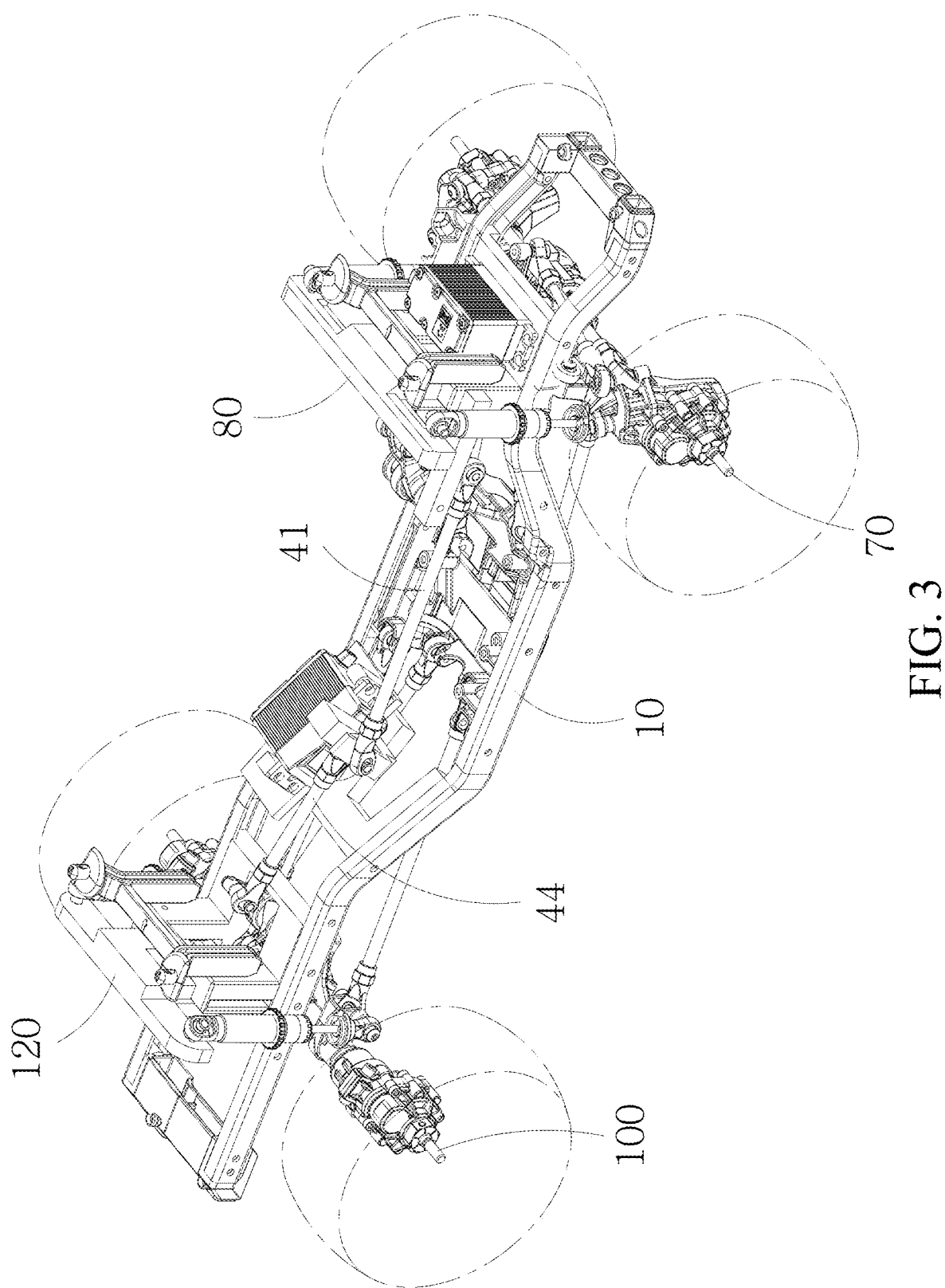
FIG. 3 depicts the 3D view of the shock absorbing system of the amphibious and remotely controlled vehicle according to the present invention.

Referring to FIG. 1 and FIG. 2. FIG. 1 depicts the first type of the chassis of the shock absorbing system of the amphibious and remotely controlled vehicle according to an embodiment of the present invention. FIG. 2 depicts the second type of the chassis of the shock absorbing system of the amphibious and remotely controlled vehicle according to an embodiment of the present invention. As shown in FIGS. 1 and 2, one purpose of the present invention is to provide a shock absorbing system of an amphibious and remotely controlled vehicle disposing to a casing of the remotely controlled vehicle, including the chassis 10, the controller 20, the transmission shaft 30, the first transmission member 41, the second transmission member 42, the third transmission member 43, the front wheel driving mechanism 50, the fourth transmission member 44, the fifth transmission member 45, the sixth transmission member 46, the rear wheel driving mechanism 90 and the smart electronic device, wherein the chassis 10 is connected to the casing of the remotely controlled vehicle. The controller 20 is disposed inside the casing of the remotely controlled vehicle and connected to the chassis 10. According to an embodiment of the present invention, the controller 20 may be implemented with a microcontroller, an FPGA (field-programmable gate array) or an ASIC (application-specific integrated circuit), but not limited thereto. A first end of the transmission shaft 30 is connected to the controller 20. Referring to FIGS. 1-3, the first transmission member 41, the third transmission member 43, the fourth transmission member 44 and the sixth transmission member 46 are a straight structure. The second transmission member 42 and the fifth transmission member 45 are substantially an L-shape structure. One end of the first transmission member 41 is pivotally connected to a second end of the transmission shaft 30, and the second end of the transmission shaft 30 is adjacent to a front end of the casing of the remotely controlled vehicle. One end of the second transmission member 42 is pivotally connected to the other end of the first transmission member 41. One end of the third transmission member 43 is pivotally connected to the other end of the second transmission member 42. The front wheel driving mechanism 50 is connected to the casing of the remotely controlled vehicle and is adjacent to the front end of the casing of the remotely controlled vehicle. The front wheel driving mechanism 50 is pivotally connected to the other end of the third transmission member 43. One end of the fourth transmission member 44 is pivotally connected to the second end of the transmission shaft 30, and the other end of the fourth transmission member 44 is adjacent to a rear end of the casing of the remotely controlled vehicle. One end of the fifth transmission member 45 is pivotally connected to the other end of the fourth transmission member 44. One end of the sixth transmission member 46 is pivotally connected to the other end of the fifth transmission member 45. The rear wheel driving mechanism 90 is connected to the casing of the remotely controlled vehicle and adjacent to the rear end of the casing of the remotely controlled vehicle. The rear wheel driving mechanism 90 is pivotally connected to the other end of the sixth transmission member 46. The smart electronic device is connected to the controller 20.

For the first type of the shock absorbing system of the amphibious and remotely controlled vehicle, the smart electronic device transmits a first control message to the controller 20. The controller 20 drives the transmission shaft 30 to rotate toward a first direction according to the first control message. The transmission shaft 30 leads the first transmission member 41, the second transmission member 42, the third transmission member 43, the fourth transmission member 44, the fifth transmission member 45 and the sixth transmission member 46 to pivot. The controller 20 and the chassis 10 move away from the casing of the remotely controlled vehicle. For the second type of the shock absorbing system of the amphibious and remotely controlled vehicle, the smart electronic device transmits a second control message to the controller 20. The controller 20 drives the transmission shaft 30 to rotate toward a second direction according to the second control message. The transmission shaft 30 leads the first transmission member 41, the second transmission member 42, the third transmission member 43, the fourth transmission member 44, the fifth transmission member 45 and the sixth transmission member 46 to pivot. The controller 20 and the chassis 10 move toward the casing of the remotely controlled vehicle.

When the transmission shaft 30 rotates toward the first direction, the second end of the transmission shaft 30 moves toward the front wheel driving mechanism 50. When the transmission shaft 30 rotates toward the second direction, the second end of the transmission shaft 30 moves toward the rear wheel driving mechanism 90.

Referring to FIG. 3, which depicts the structure of the front wheel driving mechanism 50 and the rear wheel driving mechanism 90 in detail. The front wheel driving mechanism 50 includes two front wheels 60, the front wheel transmission shaft 70 and the front wheel shock absorber 80. The two front wheels 60 are respectively connected to two ends of the front wheel transmission shaft 70. One end of the front wheel shock absorber 80 is disposed to the front wheel transmission shaft 70. The other end of the front wheel shock absorber 80 is pivotally connected to the other end of the third transmission member 43. The rear wheel driving mechanism 90 includes two rear wheels 100, the rear wheel transmission shaft 110 and the rear wheel shock absorber 120. The two rear wheels 100 are respectively connected to two ends of the rear wheel transmission shaft 110. One end of the rear wheel shock absorber 120 is disposed to the rear wheel transmission shaft 110. The other end of the rear wheel shock absorber 120 is pivotally connected to the other end of the sixth transmission member 46.

The controller 20 drives the transmission shaft 30 to rotate toward the first direction according to the first control message. In this case, the first transmission member 41 and the fourth transmission member 44 move toward the front wheel shock absorber 80. One end of second transmission member 42 and the other end of the fifth transmission member 45 move toward the chassis 10. The one end of the third transmission member 43 and the one end of the sixth transmission member 46 move toward the rear wheel shock absorber 120. The controller 20 drives the transmission shaft 30 to rotate toward the second direction according to the second control message. The first transmission member 41 and the fourth transmission member 44 move toward the rear wheel shock absorber 120. The one end of the second transmission member 42 and the other end of the fifth transmission member 45 move away from the chassis 10. The one end of the third transmission member 43 and the one end of the sixth transmission member 46 move toward the front wheel shock absorber 80.

The front wheel transmission shaft 70 and the rear wheel transmission shaft 110 are connected to the controller 20. The smart electronic device transmits a first operation message to the controller 20. The controller 20 drives the front wheel transmission shaft 70 and the rear wheel transmission shaft 110 according to the first operation message. The front wheel transmission shaft 70 drives the two front wheels 60 to rotate and the rear wheel transmission shaft 110 drives the two rear wheels 100 to rotate.

The shock absorbing system of the amphibious and remotely controlled vehicle further includes a propeller module. One end of the propeller module is connected to the controller 20, and the other end of the propeller module is adjacent to the rear end of the casing of the remotely controlled vehicle. The smart electronic device transmits a second operation message to the controller 20, and the controller 20 drives the propeller module to rotate according to the second operation message.

For instance, when the amphibious and remotely controlled vehicle moves on the ground, the chassis 10 thereof is set to be the second type. Since an appropriate distance exists between the chassis 10 and the ground, the chassis 10 would not be impacted by the obstacles on the road such that the vehicle may powerfully move on a bumpy road. When the user wants to control the amphibious and remotely controlled vehicle to move on the surface of the water, the user may transmits the first control message to the controller 20 via the smart electronic device. The controller 20 drives the transmission shaft 30 to rotate toward the first direction according to the first control message. The transmission shaft 30 leads the first transmission member 41, the second transmission member 42, the third transmission member 43, the fourth transmission member 44, the fifth transmission member 45 and the sixth transmission member 46 to pivot. The controller 20 and the chassis 10 move away from the casing of the remotely controlled vehicle so as to reduce the flow resistance against the amphibious and remotely controlled vehicle. Further, the second operation message is transmitted to the controller 20 via the smart electronic device. The controller 20 drives the propeller module to rotate according to the second operation message to steadily and rapidly drive the vehicle on the surface of the water by effectively using the dynamic force of the propeller module. When the user wants to control the amphibious and remotely controlled vehicle to move on the ground once again, the user may transmit the second control message to the controller 20 via the smart electronic device. The controller 20 drives the transmission shaft 30 to rotate toward the second direction according to the second control message. The transmission shaft 30 leads the first transmission member 41, the second transmission member 42, the third transmission member 43, the fourth transmission member 44, the fifth transmission member 45 and the sixth transmission member 46 to pivot. The controller 20 and the chassis 10 move toward the casing of the remotely controlled vehicle. Further, the user may transmit the first operation message to the controller 20 via the smart electronic device. The controller 20 drives the front wheel transmission shaft 70 and the rear wheel transmission shaft 110 according to the first operation message such that the front wheel transmission shaft 70 drives the two front wheels 60 to rotate and the rear wheel transmission shaft 110 drives the two rear wheels 100 to rotate. The above description is merely illustrative and not restrictive.

The above description is merely illustrative and not restrictive. Any equivalent modification or change without departing from the spirit and scope of the present disclosure should be included in the appended claims.

What is claimed is:

1. A shock absorbing system of an amphibious and remotely controlled vehicle suitable for a casing of a remotely controlled vehicle, the shock absorbing system comprising:

a chassis, connected to the casing of the remotely controlled vehicle;
a controller, disposed in the casing of the remotely controlled vehicle and connected to the chassis;
a transmission shaft, a first end of the transmission shaft being connected to the controller;
a first transmission member, one end of the first transmission member being pivotally connected to a second end of the transmission shaft, and one other end of the first transmission member being adjacent to a front end of the casing of the remotely controlled vehicle;
a second transmission member, one end of the second transmission member being pivotally connected to the other end of the first transmission member;
a third transmission member, one end of the third transmission member being pivotally connected to one other end of the second transmission member;
a front wheel driving mechanism, connected to the casing of the remotely controlled vehicle and adjacent to the front end of the casing of the remotely controlled vehicle, and the front wheel driving mechanism being pivotally connected to one other end of the third transmission member;
a fourth transmission member, one end of the fourth transmission member being pivotally connected to the second end of the transmission shaft and one other end of the fourth transmission member being adjacent to a rear end of the casing of the remotely controlled vehicle;
a fifth transmission member, one end of the fifth transmission member being pivotally connected to the other end of the fourth transmission member;
a sixth transmission member, one end of the sixth transmission member being pivotally connected to one other end of the fifth transmission member;
a rear wheel driving mechanism, connected to the casing of the remotely controlled vehicle and being adjacent to the rear end of the casing of the remotely controlled vehicle, and the rear wheel driving mechanism being pivotally connected to one other end of the sixth transmission member; and
a smart electronic device, connected to the controller;
wherein when the smart electronic device transmits a first control message to the controller, the controller drives the transmission shaft to pivot on the first end toward a first direction according to the first control message, the transmission shaft leads the first transmission member, the second transmission member, the third transmission member, the fourth transmission member, the fifth transmission member and the sixth transmission member to pivot, and the controller and the chassis move away from the casing of the remotely controlled vehicle; when the smart electronic device transmits a second control message to the controller, the controller drives the transmission shaft to pivot on the first end toward a second direction according to the second control message, the transmission shaft leads the first transmission member, the second transmission member, the third transmission member, the fourth transmission member, the fifth transmission member and the sixth transmission member to pivot, and the controller and the chassis move toward the casing of the remotely controlled vehicle.

2. The shock absorbing system of the amphibious and remotely controlled vehicle of claim 1, wherein when the transmission shaft pivots on the first end toward the first direction, the second end of the transmission shaft moves toward the front wheel driving mechanism; when the transmission shaft pivots on the first end toward the second direction, the second end of the transmission shaft moves toward the rear wheel driving mechanism.

3. The shock absorbing system of the amphibious and remotely controlled vehicle of claim 2, wherein the front wheel driving mechanism comprises two front wheels, a front wheel transmission shaft and a front wheel shock absorber, the two front wheels are respectively connected to two end of the front wheel transmission shaft, one end of the front wheel shock absorber is disposed to the front wheel transmission shaft, one other end of the front wheel shock absorber is pivotally connected to the other end of the third transmission member, the rear wheel driving mechanism comprises two rear wheels, a rear wheel transmission shaft and a rear wheel shock absorber, the two rear wheels are respectively connected to two ends of the rear wheel transmission shaft, one end of the rear wheel shock absorber is disposed to the rear wheel transmission shaft, and one other end of the rear wheel shock absorber is pivotally connected to the other end of the sixth transmission member.

4. The shock absorbing system of the amphibious and remotely controlled vehicle of claim 3, wherein when the controller drives the transmission shaft to pivot toward the first direction according to the first control message, the first transmission member and the fourth transmission member move toward the front wheel shock absorber, the end of the second transmission member and the other end of the fifth transmission member move toward the chassis, and the end of the third transmission member and the end of the sixth transmission member move toward the rear wheel shock absorber; when the controller drives the transmission shaft to pivot toward the second direction according to the second control message, the first transmission member and the fourth transmission member move toward the rear wheel shock absorber, the end of the second transmission member and the other end of the fifth transmission member move away from the chassis, and the end of the third transmission member and the end of the sixth transmission member move toward the front wheel shock absorber.

5. The shock absorbing system of the amphibious and remotely controlled vehicle of claim 3, wherein the front wheel transmission shaft and the rear wheel transmission shaft connect the controller, the smart electronic device transmits a first operation message to the controller, the controller drives the front wheel transmission shaft and the rear wheel transmission shaft according to the first operation message, the front wheel transmission shaft drives the two wheels to rotate, and the rear wheel transmission shaft drives the two rear wheels to rotate.

6. The shock absorbing system of the amphibious and remotely controlled vehicle of claim 1, further comprising a propeller module, one end of the propeller module being connected to the controller, one other end of the propeller module being adjacent to the rear end of the casing of the remotely controlled vehicle, the smart electronic device transmitting a second operation message to the controller, and controller driving the propeller module to rotate according to the second operation message.

* * * * *